United States Patent [19]

Bailey

[11] Patent Number: 4,505,967
[45] Date of Patent: Mar. 19, 1985

[54] HIGH-ANGULARITY RETROREFLECTIVE SHEETING AND METHOD FOR MANUFACTURE

[75] Inventor: Terry R. Bailey, Woodbury, Minn.

[73] Assignee: Minnesota Mining and Manufacturing Company, St. Paul, Minn.

[21] Appl. No.: 483,604

[22] Filed: Apr. 11, 1983

[51] Int. Cl.³ .................... G02B 5/128; B32B 3/00
[52] U.S. Cl. .................... 428/164; 350/105; 156/276; 427/163; 427/204; 428/325; 428/344; 428/913; 428/161
[58] Field of Search ............ 350/105; 428/325, 913, 428/344, 164; 427/163, 203, 204; 156/276

[56] References Cited

U.S. PATENT DOCUMENTS

| | | | |
|---|---|---|---|
| 3,702,213 | 11/1972 | Schwab | 350/105 |
| 3,795,435 | 3/1974 | Schwab | 350/105 |
| 4,104,102 | 8/1978 | Eagon et al. | 350/105 |
| 4,226,658 | 10/1980 | Carlson et al. | 156/247 |
| 4,348,312 | 9/1982 | Tung | 428/144 |
| 4,367,920 | 1/1983 | Tung et al. | 350/105 |
| 4,377,988 | 3/1983 | Tung et al. | 350/105 |

FOREIGN PATENT DOCUMENTS 28837 6/1973 Japan .

Primary Examiner—George F. Lesmes
Assistant Examiner—William M. Atkinson
Attorney, Agent, or Firm—D. M. Sell; J. A. Smith; R. R. Tamte

[57] ABSTRACT

A new embedded-lens retroreflective sheeting which exhibits superior properties, including superior angularity, and which is made by a new method of manufacture involving lamination techniques. Microspheres are embedded into a first polymeric layer to less than one-half the average diameter of the microspheres, and a preformed spacing film is laminated to the microsphere covered surface of the first layer so as to obtain conformation of the spacing film in a substantially constant thickness over a useful portion of the back surface of the microspheres.

29 Claims, 10 Drawing Figures

HIGH-ANGULARITY RETROREFLECTIVE SHEETING AND METHOD FOR MANUFACTURE

FIELD OF THE INVENTION

The present invention provides a new embedded-lens retroreflective sheeting which exhibits superior properties, including superior angularity, and which is made by a new method of manufacture involving lamination techniques.

BACKGROUND ART AND DISCLOSURE OF INVENTION

The most widely used form of retroreflective sheeting is the "enclosed-lens" or "embedded-lens" form originally taught in U.S. Pat. No. 2,407,680. Such sheeting includes a transparent polymeric sheet, a monolayer of microspheres embedded within the sheet, and a specularly reflective layer underlying the back surface of the polymeric sheet. To achieve maximum reflection from such a sheeting, the distance between the microspheres and the specularly reflective layer must be closely controlled to place the latter at the approximate location where light rays are focused by the microspheres. The conventional approach to providing such a controlled spacing is to coat the microspheres with a polymeric layer, known as the spacing layer, prior to application of the specularly reflective layer.

A problem with this conventional coating approach is that the coated layer is generally at an optimum thickness only in a small area directly in back of individual microspheres. The coated material tends to flow into the areas between the microspheres, giving those areas an enlarged thickness and spacing the specularly reflective layer away from the focal point of the microspheres. Incident light that is perpendicular to the sheeting, or only slightly displaced from perpendicular, is brightly reflected since it is focused onto the small areas of optimum spacing in back of individual microspheres. But light impinging on the sheeting at an angle substantially displaced from perpendicular is focused to a point in front of the specularly reflective layer, and retroreflection at those angles is reduced.

Despite the recognized disadvantage of this limited "angularity" of conventional embedded-lens retroreflective sheeting, no significant improvement in the angularity of commercial embedded-lens sheeting has been obtained for many years. The sheeting continue to have half-brightness angles (the angle at which light incident on the sheeting is reflected at half the brightness that light perpendicular to the sheeting would be reflected) of about 30° to 45°. Such an angularity is adequate for many purposes, but not for other potentially important uses such as signing on the sides of trucks or other vehicles. Motorists often view a sign on the side of a truck from a position other than perpendicular to the truck, at large incidence angles far beyond the angles at which existing embedded-lens reflective sheetings are reflective.

U.S. Pat. No. 4,367,920 teaches retroreflective sheeting products of improved angularity, and processes for making such sheeting, involving embedding a monolayer of microspheres into a polymeric layer to less than one-half the average diameter of the microspheres, and laminating a preformed spacing film to the microsphere-covered surface of the first layer. The present invention adds to that teaching to further advance retroreflective sheeting to a state of greatly enhanced angularity.

In brief summary, the basic method of manufacture comprises the steps of preforming, preferably by extrusion, a first transparent polymeric layer; embedding a monolayer of microspheres in the layer under heat and pressure to a depth less than one-half the average diameter of the microspheres; preforming, preferably by extrusion, a second transparent polymeric layer and laminating the second layer to the microsphere-covered surface of the first layer so that the second layer follows the curved surfaces of the portions of the microspheres protruding from the first layer and contacts the first layer in the spaces between the microspheres; and coating the exposed configured surface of the second layer with a specularly reflective layer. Preferably, according to the present invention, the microspheres are embedded into the first layer to depths that leave the extreme edges of the non-embedded portions of the microspheres in substantial alignment; the microspheres are applied in lower numbers per unit area than might otherwise be obtained; and the microspheres are used in a broader range of diameters than generally regarded as optimal in the past, all to obtain further improvements in angularity. Also, the lamination is preferably achieved by use of a cushioning web comprising a polymeric material which engages the second polymeric layer and which softens during the lamination step to a softer or lower viscosity condition than the second polymeric layer.

It has been found that sheeting prepared in the manner described has an angularity never before achieved in an embedded-lens retroreflective sheeting. For example, the half-brightness angle for sheeting of the invention is generally 50° or more, and preferably 60° or more, on at least one axis of the sheeting, in contrast to the conventional half-brightness angle of about 30° to 45° noted above. Also, the new sheeting is reflective to very high incidence angles approaching 90°, whereas conventional embedded-lens sheetings have little if any reflection at angles of incidence greater than about 65°.

While not restricting ourselves to a particular mechanism or theory, it is believed that the superior angularity of the new sheeting can be attributed at least in part to the fact that in such sheeting the spacing layer conforms in a substantially constant thickness around a large portion of the back surface of the microspheres. Because of the shallow embedding of the microspheres in the first layer, there is a large unfilled space between the microspheres, which can accommodate excess portions of the spacing layer during lamination of the spacing layer to the microspheres, and thus avoid an accumulation of the material of the spacing layer that would otherwise thicken the spacing layer over portions of the back surface of the microspheres. Also, alignment of the back surfaces of the microspheres allows the spacing layer to be applied more uniformly to individual microspheres irrespective of the sizes of the microspheres. Control over the density per unit area of the microspheres further enhances conformation of the spacing layer, as does use of a softenable cushioning web during the lamination operation.

PRIOR ART STATEMENT

Previous workers besides those of U.S. Pat. No. 4,367,920 have used a preformed spacing film in embedded-lens retroreflective sheeting. However, in one approach taught in U.S. Pat. No. 3,795,435 the preformed spacing film carries a layer of adhesive, into which glass beads or microspheres are initially embedded and supported, and during conformation of the film around the microspheres the adhesive is forced between the microspheres. The adhesive occupies the space between the microspheres, so that as pictured in the drawings of the patent, the microspheres appear to be embedded to over 60 percent of their diameter in the adhesive layer and added top layers (the layers 12, 14 and 15 in FIG. 6 of U.S. Pat. No. 3,795,435). Less than about 40 percent of the diameter of the microspheres is left for the spacing film to be conformed around. The result is that there is inadequate space between the microspheres to accommodate the spacing film, and the sheeting cannot exhibit the high angularity exhibited by sheeting of the invention.

In addition, although the drawings of the patent do not indicate this fact, it would appear difficult to fully displace the adhesive on the spacing film into which the glass beads or microspheres are initially embedded from in back of the microspheres during deformation of the spacing film around the microspheres. To the extent that the adhesive is not displaced, the space between the microspheres and a specularly reflective layer coated on the spacing film will be unduly large, and the specularly reflective layer will not be fully aligned at the focal points of the microspheres.

The patent also contemplates in column 8, lines 8–24 the use of a preformed cover foil. The glass beads are said to be first positioned on the cover foil after which the preformed spacing film is coated with "adhesive in suitable thickness," and deformed around the glass beads. As the patent states, the extent of deformation of the spacing film "is largely dependent on the thickness of the adhesive layer and the pressure of the rollers or the like," but no suggestion is made that a construction different from that pictured in the drawings would be obtained.

Additional proposals for laminating a preformed spacing film into retroreflective sheeting are described in U.S. Pat. Nos. 4,023,889; 4,104,102; and 4,226,658. In all of these proposals glass microspheres are first partially embedded into a two-layer top film (in a manner described in U.S. Pat. No. 4,023,889), after which the spacing film is laminated over the protruding microspheres. As shown in FIG. 9 of U.S. Pat. No. 4,023,889, the microspheres are deeply embedded into the top film, to a depth of over 50 percent of their average diameter, with the result that the spacing film has little penetration between the microspheres, as evidenced in FIG. 9 of U.S. Pat. No. 4,023,889. Penetration is also limited by the fact that the spacing film is metallized prior to lamination, which stiffens it; and in U.S. Pat. No. 4,226,658 the spacing film is carried on a paper carrier, which limits the extent to which the spacing film can be deformed. Also, the microspheres are pressed through the bottom of the two layers of the top film into contact with the top layer, which results in alignment of the front surfaces of the microspheres, rather than alignment of the back surfaces as in preferred sheeting of the invention.

DETAILED DESCRIPTION

The invention will be further described by the following examples which refer to the attached drawings.

EXAMPLE 1

An ionically crosslinked copolymer of ethylene and methacrylic acid having a melt index of 0.6 and stabilized to ultraviolet light (Surlyn 1706 UV03 supplied by duPont) was extruded through a thin slot onto a 2-mil-thick (50 micrometers thick) polyethylene terephthlate (PET) carrier film using standard film extrusion conditions. The extruder, slot thickness and speed of the PET carrier film were adjusted to achieve a thickness for the extruded layer of 2 mils (50 micrometers).

Figure 1:
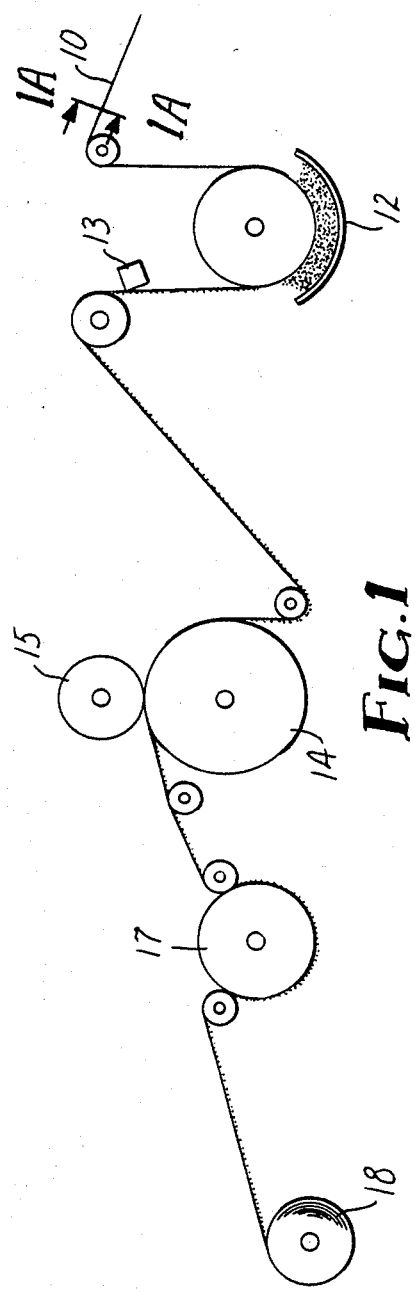
FIGS. 1, 2 and 5 are schematic diagrams of apparatus for preparing sheeting of the invention (FIGS. 1A, 2A and 2B are enlarged sectional views of sheeting being processed on the apparatus shown in FIGS. 1 and 2, respectively)

Microspheres were embedded into the extruded layer of described composite film using apparatus as shown in FIG. 1. The composite film is identified as 10 in FIG. 1, with the extruded layer of the composite film shown as 10a and the PET carrier film as 10b. The composite film 10 was pulled around a roller 11, which was heated to 240° F., with the PET layer 10b against the heated roller and the extruded layer 10a facing away from the roller. A pan 12 containing glass microspheres having an average diameter of 56 micrometers, a range in size of about 20 micrometers, and an index of refraction of 2.26 was positioned so that the microspheres formed a packed bed around the heated roller 11. As the composite film passed around the roller, the extruded layer 10a became slightly tacky and a monolayer of the microspheres became adhered to the layer. After leaving the roller, the composite film was vibrated slightly with a vibrator 13 to remove any excess microspheres, and then continued to a second roller 14, which was heated to 320° F.

The microsphere-coated side of the film traveled against the roller 14, and after traveling about 18 inches around the roller, the film engaged a silicone rubber nip roller 15, which was heated to 220° F. At the exit of the heated roll 14 and nip roll 15, the microspheres were found to have been pushed into the extruded layer 10a to about 20–40 percent of their diameter, and the non-embedded surfaces of the microspheres were substantially aligned in a common plane. The film 10, thus covered with microspheres, passes around a cooling roller 17 and then can be wound up in a roll 18 before storage for further processing (alternatively the further processing can be performed in line with the apparatus shown in FIG. 1).

A cushioning web was prepared by dissolving a polyester resin (Vitel PE307 resin available from Goodyear Chemical Company and thought to be the reaction product of ethylene glycol, neopentyl glycol, sebacic acid, isophthalic acid and terephthalic acid) in a 50/50 mixture of methylethylketone and toluol to prepare a 40-weight-percent-solids solution, coating this solution onto a 2-mil-thick (50 micrometers) PET film, and drying the coated solution completely. The dry coating was 1 mil (25 micrometers) thick. To further avoid use of solvent, the polyester could also be extruded instead of solvent-coated.

This cushioning web was then extrusion-coated with a layer adapted to serve as the spacing layer or film in the ultimate retroreflection sheeting. The layer was formed from another ionically crosslinked copolymer of ethylene and methacrylic acid having a melt index of 14 (Surlyn 1702) and was extruded through a slot onto the dry surface of the coated polyester resin on the cushioning web. The extrusion conditions were adjusted to yield a 0.75-mil-thick (about 20 micrometers thick) extruded layer.

Figure 2:
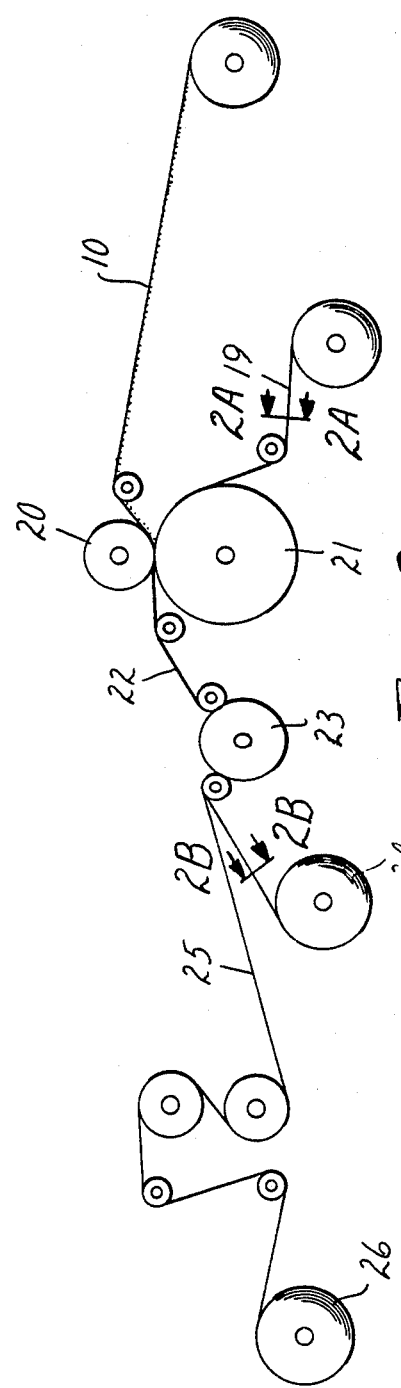
Figure 1A:
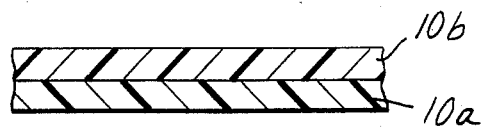
Figure 2A:
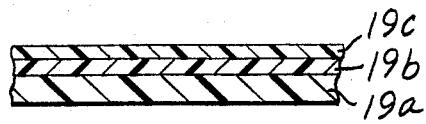
Figure 2B:
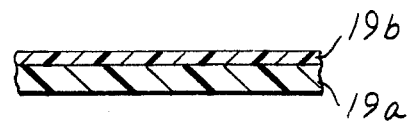

The cushioning web with extruded spacing layer was then laminated onto the previously prepared microsphere-covered film 10 using apparatus as shown in FIG. 2. The microsphere-covered film 10 and the spacing-layer-covered cushioning web 19 (comprising the PET film 19a, the coated polyester resin 19b, and the spacing layer 19c of ionic copolymer) were pressed together between a nip roller 20 and a heated roller 21. The roller 21 was heated to 280° F., and at that temperature, the ionically crosslinked copolymer in the layer 10a has a higher melt viscosity than the ionically crosslinked copolymer in the layer 19c, and the latter has a higher melt viscosity than the polyester resin in the layer 19b. These differences in melt viscosity led to the following changes within the assembly during the application of pressure between the heated roll and nip roll: the microspheres tended to remain at their original level in the layer 10a of higher-melt-viscosity copolymer; the spacing layer 19c of lower-melt-viscosity copolymer was softened and forced around the portions of the microspheres protruding out of the layer 10a, and was conformed to follow the curved surfaces of the microspheres; and the polyester resin layer 19b deformed and flowed to allow the described conforming of the layer 19c.

After passage past the heated roll 20 and nip roll 21, the microsphere-covered film 10 and spacing-layer-covered cushioning web 19 were united as an assembly 22, which was then cooled by passage around a cooling roller 23. Thereupon the cushioning web (layers 19a and 19b) was stripped away and wound in a roll 24. The remaining product 25, comprising the polyester carrier film 10b and the laminated layers 10a and 19c, with microspheres embedded between the layers, was then wound in a storage roll 26 as shown; alternatively the film could have moved directly to stations which completed the retroreflective sheeting.

The product 25 was subsequently unwound from the storage roll and aluminum was vapor-deposited onto the conformed surface of the layer 19c to form a specularly reflective layer. The polyester carrier film 10b was then removed and an acrylate-based pressure-sensitive adhesive layer coated on a silicone-coated release liner was laminated to the vapor-coated surface to form a completed retroreflective sheeting like that shown in solid lines in FIG. 3. This complete product comprised the layer 10a of higher melt viscosity copolymer, serving as a top film; the glass microspheres 27; the conformed layer 19c of lower melt viscosity copolymer, serving as a spacing film or layer; the layer 28 of vapor-deposited aluminum; the layer 29 of pressure-sensitive adhesive; and the release liner 30.

The retroreflectivity of the completed sheeting was then measured with a retroluminometer as described in United States Defensive Publication No. T987,003. This instrument projects a one-inch-diameter circle of light onto a sample of the sheeting and measures the light returned at a selected divergence angle. At the small incident angle of 4° (instead of 0° to eliminate specular reflection from the face of the sheeting) and 0.2° divergence angle, the retroreflectivity of the completed sheeting was found to be 100 candelas per lumen. The retroluminometer was then swung away from the perpendicular with the same light beam continuing to be projected on the sample. The angle at which the sheeting had half the brightness (50 candelas per lumen) was found to be 52° when measured downweb and 65° when measured crossweb. Also, some samples of sheeting of the example remained visibly reflective at 85° in the cross-web direction.

Figure 3:
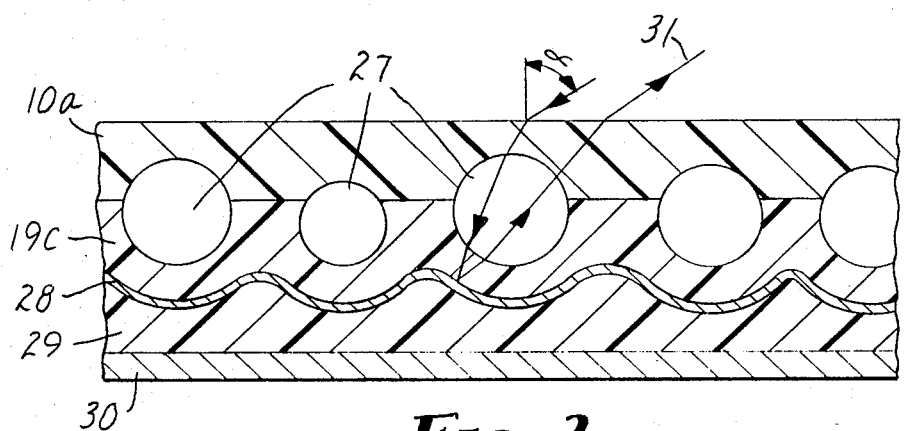
FIG. 3 is a sectional view of a representative sheeting of the invention.
Figure 4:
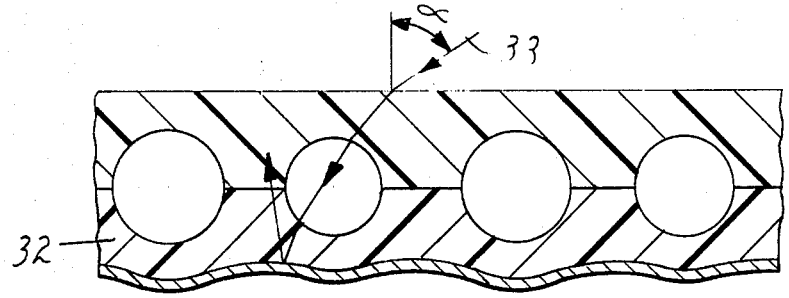
FIG. 4 is a sectional view through a representative prior art retroreflective sheeting.

The excellent angularity represented by the measurements of retroreflectivity reported in the previous paragraph contrasts sharply with the angularity exhibited by conventional commercial retroreflective sheetings, which have half-brightness angles of about 30° to 45° and become essentially non-reflective at incidence angles of about 65°. FIGS. 3 and 4 illustrate a basis that is understood to at least partially explain the measured superiority in angularity. As shown in FIG. 3, a light ray 31, which is incident on the sheeting at a high incidence angle alpha ($\alpha$), is transmitted through a microsphere 27 and spacing layer 19c into engagement with the specularly reflective layer 28, which penetrates deeply between the microspheres and conforms well to the shape of the microspheres behind which it is disposed. The light ray 31 is reflected by the specularly reflective layer 28 back toward the source of the light. By contrast, in conventional retroreflective sheeting, such as shown in FIG. 4, the spacing layer 32 is not conformed as fully around the microsphere, and the specularly reflective layer does not conform as concentrically around the microspheres, as in sheeting of the invention. The result is that a light ray 33, which strikes the prior art sheeting at the incidence angle alpha ($\alpha$) is not reflected by the specularly reflective layer back towards the source of the light, but instead is scattered within the sheeting or to some point outside the sheeting.

It may be noted that measurements of angularity should be measured on sheeting, or at a point on sheeting, where the reflected light is white and does not have a significant blue or yellow shade to it. Reflection from a retroreflective sheeting can be adversely or beneficially affected if the spacing layer is thicker or thinner than optimum, which is manifested by a blue or yellow shade to the reflected light. Most accurate results are obtained when the reflected light is white.

EXAMPLE 2

Example 1 was repeated except that (a) the high-melt-viscosity ionic copolymer of the layer 10a in which the microspheres were partially embedded was replaced with a thermoplastic aliphatic polyurethane resin having a melt index of 17.2 ("Q-thane" PN03-93E supplied by K. J. Quinn); (b) the roller 14 in FIG. 1 was heated to 250° F.; (c) the cushioning web was a commercially available web comprising a polyethylene-coated paper in which the polyethylene had a melt index of about 10 and the polyethylene coating was about 1 mil thick; (d) the low-melt-viscosity ionic copolymer in the spacing layer 19c was replaced by a thermoplastic aliphatic polyurethane polyurethane resin having a melt index of 2.6 ("Q-thane" P342-9L supplied by K. J. Quinn); and (e) the heated roll 21 in FIG. 2 used to laminate the microsphere-covered web 10 and spacing-layer-covered cushioning web 19 was heated to 320° F. (melt index was measured by the procedure of ASTM D1238 using condition (e) for polyethylene and using a temperature of 175° C. and load of 5000 grams for the polyurethane resins).

The retroreflectivity of the completed reflective sheeting was about 110 candelas per lumen of incident light at an incidence angle of 5°, and the sheeting exhibited half-brightness angles of 47° downweb and 55° crossweb.

Sheeting of this example exhibited novel stretchability for retroreflective sheeting. For example, when stretched ten times to 125 percent of its original dimensions, with a ten second relaxation between stretches, and then measured as to reflective brightness five minutes after stretching was completed, the sheeting retained 91 percent of its original reflective brightness.

EXAMPLE 3

Example 1 was repeated except that the composite film 10 was replaced with a composite film that comprised a UV-stabilized 1-mil-thick PET film (using a stabilizer as described in U.S. Pat. No. 3,580,927, which had been primed in the manner described in U.S. Pat. No. 3,188,266) and a 1-mil-thick layer of ionically cross-linked copolymer of ethylene and methacrylic acid having a melt index of 5 (Surlyn 1652 SR). Microspheres were partially embedded in the copolymer film, and the whole two-layer composite film was included in the finished complete reflective sheeting, rather than stripping away the PET film. The roll 14 in FIG. 1 was heated to 280° F. The completed reflective sheeting had a reflectivity of about 90 candelas per lumen at an incidence angle of −4° as measured in the manner described above and half-brightness angles of 55° downweb and 65° crossweb.

EXAMPLE 4

Example 1 was repeated except that no cushioning web was used, and lamination of the spacing layer to the microsphere-covered layer was accomplished by vacuum-forming techniques. The lower-melt-viscosity ionic copolymer (Surlyn 1702) was used for the spacing layer but the copolymer was coated onto a 2-mil-thick (50-micrometer-thick) PET film rather than onto the cushioning web. The microsphere-covered film 10 described in Example 1 was laid onto a vacuum plate, with the microspheres facing away from the vacuum plate. The PET carrier film was stripped away from the lower-melt-viscosity ionic copolymer, leaving the latter as a free film which was then laid onto the microsphere-covered film. The free copolymer film was greater in length and width than the microsphere-covered film 10 and the vacuum plate and was arranged to cover the entire vacuum plate and microsphere-covered film. A vacuum was drawn, which pulled the free copolymer film down toward the vacuum plate and against the microspheres. The assembly was heated with a heat gun, which softened the free copolymer film and allowed to vacuum to complete shaping of the film closely around the protruding portions of the microspheres and to achieve bonding of the film to the microspheres and to the portions of the film 10 between the microspheres.

As the above examples illustrate, the top film and spacing film in retroreflective sheeting of the invention may be formed from a variety of polymeric materials. In general, these polymeric materials have a soft stage, as typified by the thermosoftening of partially amorphous or semicrystalline thermoplastic polymers, during which microspheres can be embedded in the films and the films laminated together. The amorphous character of the polymers is indicated by the fact that, rather than having a sharp melting point and large changes in melt viscosity as the temperature rises through the melting point, they melt or soften over a rather broad temperature range, and have only moderate or gradual changes in melt viscosity as the temperature rises through the melting range.

Figure 6:
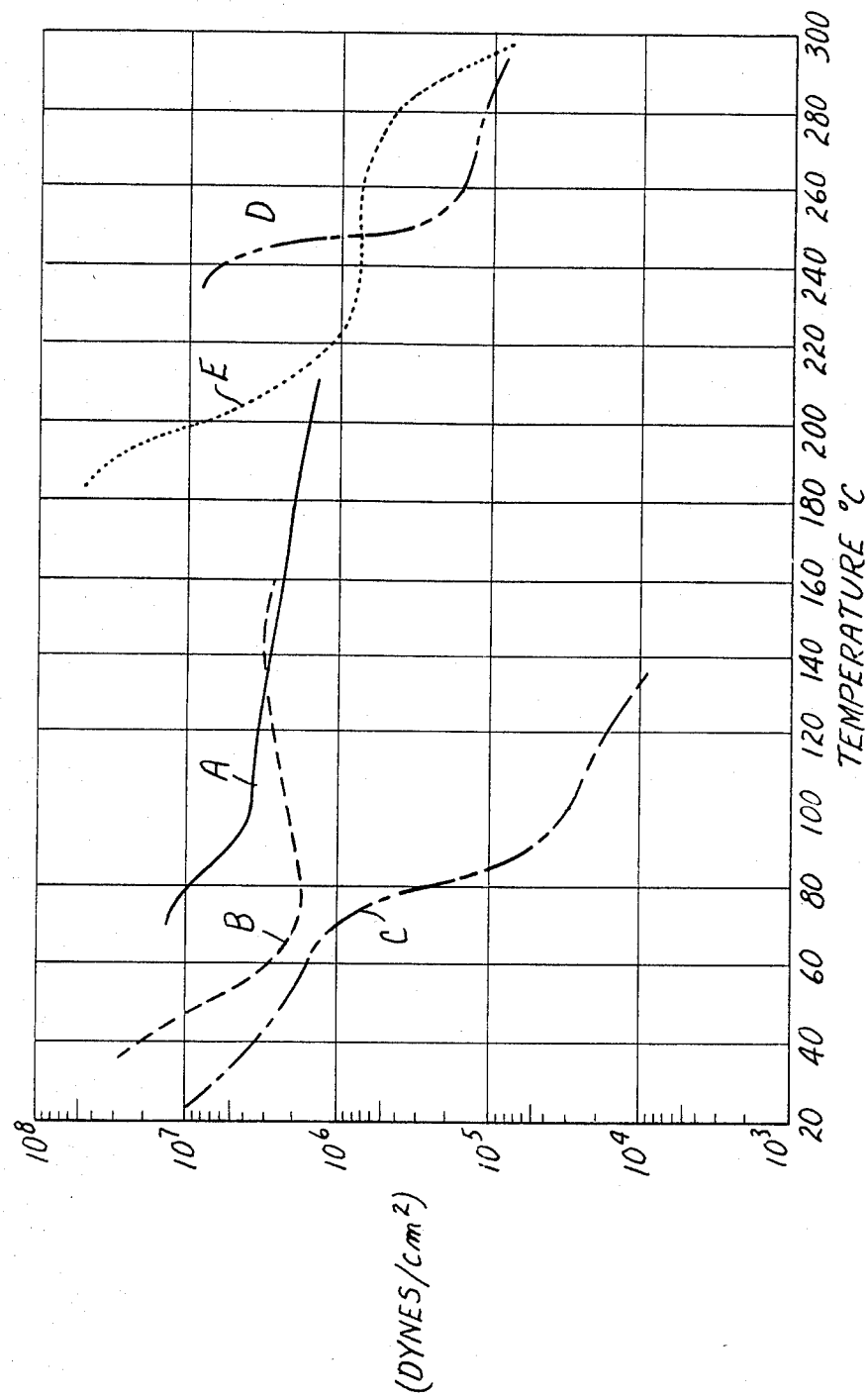
FIG. 6 is a set of graphs of loss modulus in dynes per square centimeter versus temperature in degrees centigrade for a variety of polymeric materials showing a property useful in achieving retroreflective sheeting of the invention.

This characteristic is illustrated in FIG. 6, where the loss modulus of representative polymeric materials is plotted versus temperature. The loss modulus was measured on a Rheometrics Mechanical Spectrometer where a 25-millimeter-diameter disk-shaped specimen of the material about 2 millimeters thick is mounted between a torque transducer on one side and a rotary driving or oscillating mechanism on the other side. The specimen is then subjected to an initial strain of 1-2 percent at a frequency of 10 Hertz at increasing temperature. The magnitude of rotation measured by the torque transducer which is out of phase with the driving mechanism is a measure of the viscosity of the material being tested and is reported in dynes/square centimeter on the ordinate of the graph. Curves A and B in FIG. 6 show the loss modulus measured for the material of 10a in, respectively, Example 1 (i.e., Surlyn 1706) and Example 2 (i.e., Q-thane PN03-93E). Curves C, D and E show the loss modulus measured for ethylene vinyl acetate, cellulose acetate, and polyethylene terephthalate.

Best results in practice of this invention are obtained with materials having properties as represented in Curves A and B where there is a plateau or gradual change in viscosity over a longer temperature interval, such as 50° or 75° C. or more, in the softening range of the material. For example, upon reaching a loss modulus of about $10^6$ dynes per square centimeter, subsequent heating of the material of Curves A and B through such a temperature interval causes the loss modulus to change by less than an order of magnitude. Such a broad softening range and moderate or gradual change in melt viscosity eases processing, and allows a controlled introduction of microspheres to desired depths in the top film. Because of the broad softening range, some pressure is required to force the microspheres into the film, whereby the unembedded edges of the microspheres tend to be aligned at a common level, i.e., at the surface of a tool, such as a pressure roller, that engages the microspheres and applies the pressure. A broad softening range also allows a controlled shaping of the spacing film in a substantially constant thickness over the protruding or unembedded edges of the microspheres.

The polymeric material of the cushioning web should soften to a lower viscosity, i.e., should have a lower loss modulus, than the second polymeric layer during the lamination operation. For example, the polyester resin used in the cushioning web of Example 1 exhibits a loss modulus at the lamination temperature of 280° F. (about 140° C.) of about $6 \times 10^5$ dynes per square centimeter, while polyethylene as used in the cushioning web of Example 2 exhibits a loss modulus at the lamination temperature of 320° F. (about 160° C.) was $2.6 \times 10^5$ dynes per square centimeter.

In completed sheeting of the invention, the polymeric films should not appreciably soften at temperatures lower than about 200° F. (100° C.), to maintain needed dimensional stability for the product during expected conditions of use. However, when polyester carrier webs are used in manufacture of sheeting of the invention, the polymeric materials should soften at temperatures less than about 400° F. (200° C.), when polyester loses its dimensional stability.

The materials of the top and spacing films or layers should be compatible with one another and adapted to form a good bond together, and/or to the microspheres. The needed bond adhesion can be tested by laminating films of the materials together, or to a plate of the material from which the microspheres are made. Preferably the adhesion between the components is greater than the tensile strength of the materials.

Also, the material of the spacing film preferably can be coated with metal in a vacuum deposition process. For example, the polymer should not give off molecules in a vacuum at a rate that impedes deposition of metal so as to form a smooth adhered metal film.

Acrylics, aliphatic urethanes, and polyesters are particularly useful polymeric materials because of their outdoor stability. In addition, weathering stabilizers are generally included in the polymeric films, such as ultraviolet light absorbers, antioxidants, and materials that scavenge or inhibit the action of chemical radicals within the films. Ionomers, (i.e., ionically croxxlinked polymers such as the copolymers used in the examples, particularly copolymers of ethylene and an acrylic or methacrylic acid), vinyls, fluoropolymers, polyethylenes, cellulose acetate butyrate, polycarbonates, and polyarylates are other examples of polymers that may be used in sheeting of the invention. In some uses deficiencies in a particular polymer are overcome by use of a multilayered film, whereby, for example, a polymer that softens over a short temperature interval is still useful as a layer in which to pressure-embed microspheres, because the microspheres sink only to the level of a support film in which the softenable layer is carried.

It is preferred to apply a specularly reflective layer to the spacing film or layer after the film has been laminated into the sheeting product and conformed to the microspheres. The specularly reflective layer can also be applied to the spacing film prior to the lamination step, but in that event tends to crack during the lamination and conformation step, whereupon reflective brightness is reduced. Also, the specularly reflective layer is somewhat stiff and can reduce conformation of the spacing film to the microspheres and cause it to wrinkle rather than smoothly conform.

Various other layers can be included in sheeting of the invention in addition to those discussed. For example, one or more layers may be added to the top film to improve weathering resistance (e.g., by use of an acrylic layer), or to provide added hardness (e.g., by use of an epoxy-terminaed silane layer), or to improve cleanability (e.g., by use of a polytetrafluoroethylene layer).

Adhesive or other layers are generally applied over the specularly reflective layer to complete the sheeting. Such layers protect the specularly reflective layer and also usually serve a functional purpose such as adhering the sheeting to a substrate. Conventional pressure-sensitive adhesives such as acrylate-based adhesives, or heat- or solvent-activated adhesives are typically used, and may be applied by conventional procedures, e.g., by laminating a preformed layer of adhesive on a carrier web or release liner to the specularly reflective layer.

The index of refraction an average diameter of the microspheres and the index of refraction of the material of the top layer and spacing layer dictate the thickness of the spacing film. The index is generally in the range of 2.0 to 2.5, and more typically about 2.2 to 2.3, in which case the thickness of the spacing film behind the microspheres should be about one-quarter of the average microsphere diameter. The microspheres can range from at least 40 to 120 micrometers in average diameter, but preferably they are between about 50 and 90 micrometers in average diameter. The microspheres can be treated, e.g., with an adhesion-promoting agent such as an aminosilane, to improve the bond of the microspheres to the polymeric films.

The microspheres vary statistically in size, which is of value because it allows greater latitude in the thickness that the spacing film or layer must exhibit in the completed sheeting. Some microspheres within a broad range of microsphere diameters, i.e., a range of diameters equal to about 50 percent or more of the average diameter of the microspheres, will be in appropriate size relationship with the spacing film, even if the spacing film varies from its intended thickness because of imprecision during extrusion or lamination. With a broad variation in microsphere diameters, it is especially helpful for the extreme edges of the microspheres protruding from the top film to be in alignment, because the film can then more easily contact all sizes of beads, small or large, and can be more easily pressed around all these sizes.

Figure 7:
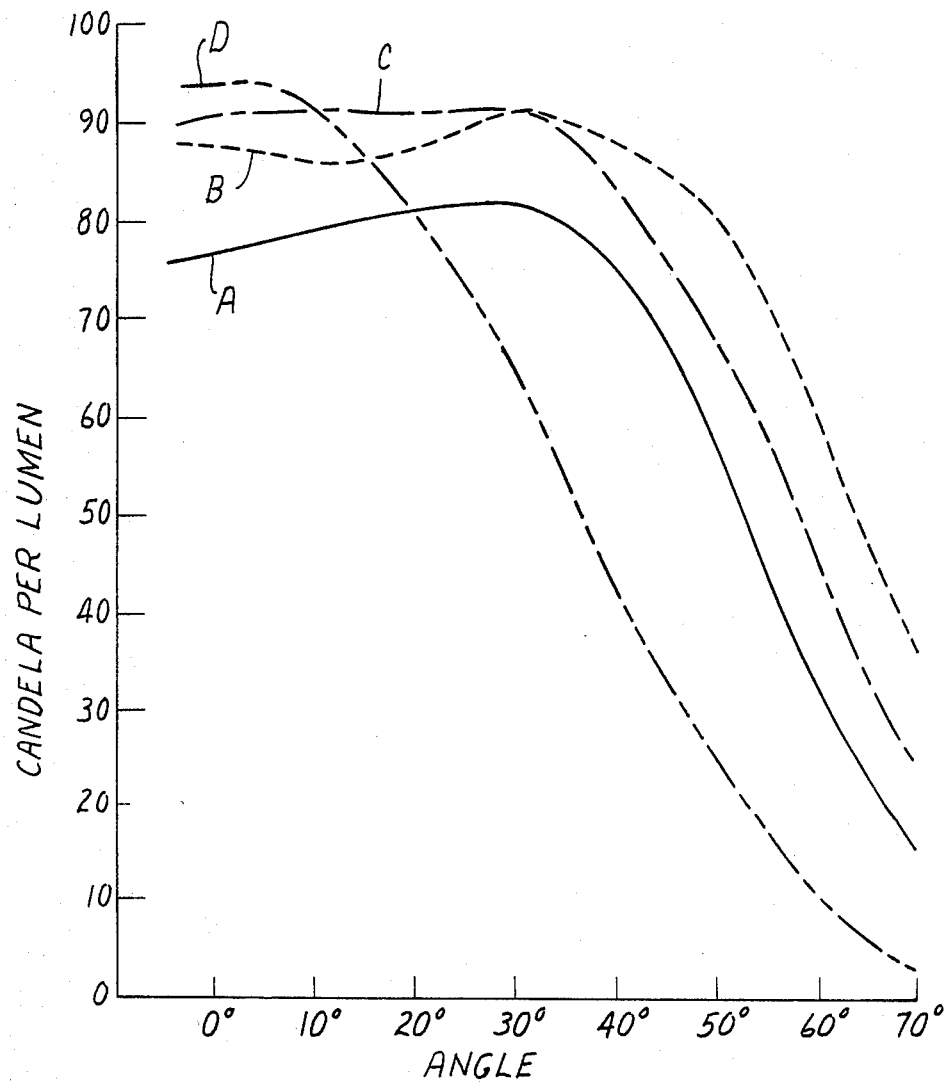
FIG. 7 is a set of graphs of retroreflective brightness in candelas per lumen of incident light versus the angle of incidence of the light for exemplary sheetings of the invention and a representative prior-art sheeting.

FIG. 7 illustrates some of the results that have been obtained. Curve A plots retroreflective brightness in candelas per lumen of incident light versus the angle of incidence of the light measured in the downweb direction for sheeting of the invention made by the method and from the materials described in Example 1; Curve B shows the results measured crossweb on similar sheeting made using more broadly classified microspheres, namely microspheres averaging 73 micrometers in diameter and varying in diameter through a range of about 40 micrometers (i.e., from 53 to 93 micrometers in diameter); Curve C shows the results downweb for the sheeting reported on in Curve B; and Curve D shows the results obtained either downweb or crossweb for a representative commercial embedded lens retroreflective sheeting.

The best angularity in products of the invention has so far been achieved when the microspheres are present at lower than maximum density, e.g., so as to cover less than about 75 percent of the area of the polymeric layer into which the microspheres are embedded, and preferably about 65 percent or less of the area. Such a less-than-maximum density, and the consequent greater spacing between microspheres, allows the spacing film or layer to be pressed more deeply between the microspheres and to follow in a substantially uniform thickness a greater portion of the surface of the microspheres. However, greater retroreflective brightness is achieved by use of microspheres at greater density.

Figure 5:
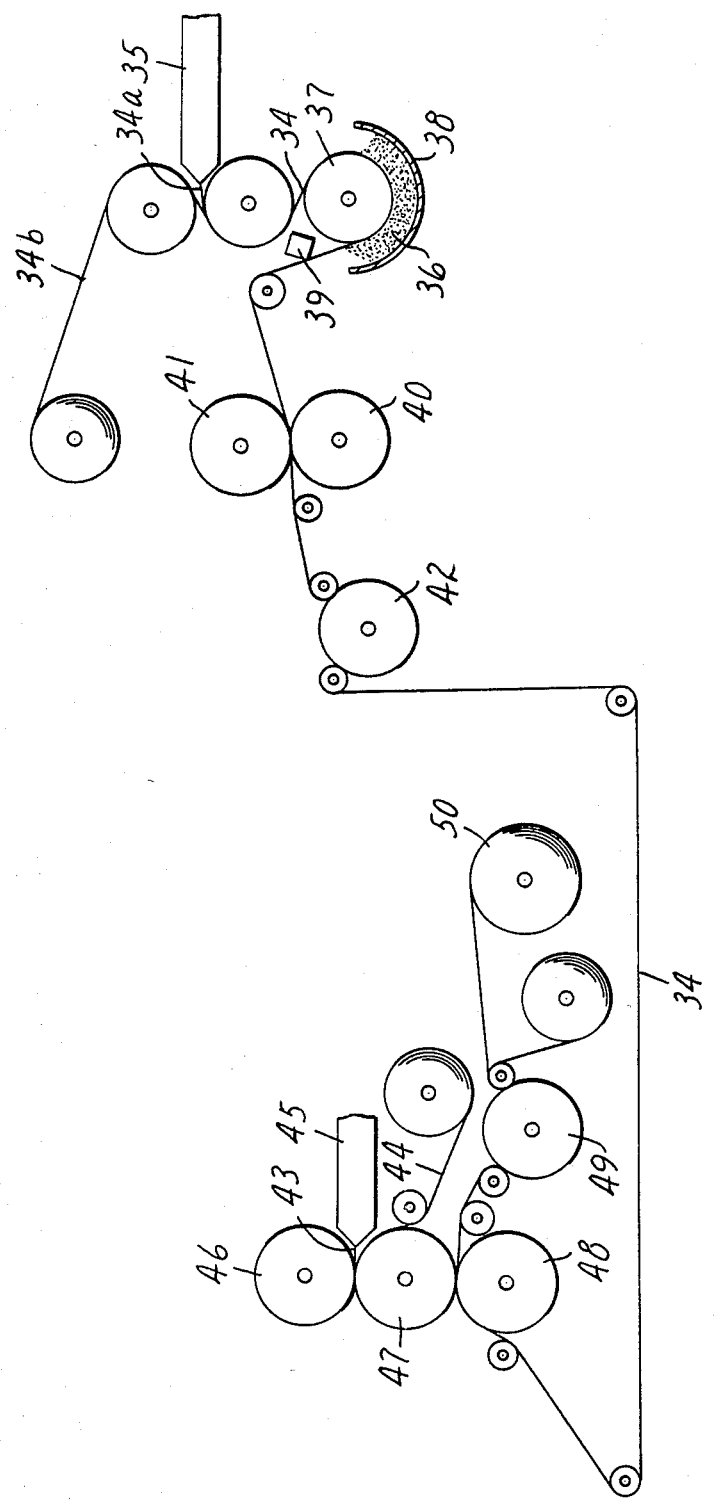

In a preferred practice of the invention the lamination of the microsphere-covered film and spacing film is performed in line, i.e., as part of a continuous process. Extrusion of the microsphere-carrying and spacing films and the operation of embedding microspheres in the film also can be part of the process. Apparatus for performing such a continuous process is schematically pictured in FIG. 5. In this apparatus a film 34a is extruded through an extruder 35 onto a carrier film 34b. Microspheres 36 are embedded in the resulting composite film 34 using a heated roll 37, microsphere-supporting pan 38, vibrator 39, heated and nip rolls 40 and 41 and cold roller 42 in the same manner as described in Example 1 above. A spacing layer or film 43 is extruded onto a cushioning web 44 in the general manner described in Example 1, using nip rollers 46 and 47; and the spacing film is laminated to the microsphere-carrying film 34 using a heated roller 48, nip roller 47, and a cooling roller 49. The cushioning web is stripped away and wound in roll 50.

The use of one continuous process for extruding and laminating allows a unique opportunity to improve the process and save costs. This improvement is accomplished by measuring or viewing the retroreflectivity of the web product after lamination of the microsphere-covered film and spacing film, e.g., by beaming a light at the laminated product and measuring the retroreflectivity, generally at an incidence angle of about 5°. To the extent that reflectivity is lower than standard the operations in the process can be directly altered, e.g., by changing the thickness of the extruded spacing film to raise reflectivity to the standard level. The result is to minimize the amount of reflective sheeting manufactured with less than standard reflectivity.

The films incorporated in sheeting of the invention may be colored, e.g., thrugh inclusion of a transparent pigment or dye, whereby the sheeting is given a desired color. Also, images may be printed on one or more of the films. When the images are printed on surfaces that are embedded within the sheeting, the images become embedded in the sheeting and are thereby improved in durability. Special reflective effects can be obtained depending on where the images are embedded and on the dimensions of lines in the image; e.g., images printed on the spacing film may become visible only during retroreflective viewing, especially if formed with narrow lines (as taught, for example, by U.S. Pat. No. 3,154,872).

What is claimed is:

1. Retroreflective sheeting comprising first and second transparent polymeric layers; a monolayer of transparent microspheres embedded in the first layer to on the average less than half their diameter but more than one-tenth their diameter, with the extreme edges of the portions of the microspheres protruding from the first layer being aligned in a substantially common plane, and with the second transparent polymeric layer being laminated in substantially full contact to the microsphere-covered surface of the first layer, whereby it is in contact with the portions of the first layer between the microspheres; and a specularly reflective layer coated on the exposed configured surface of the second layer; said microspheres varying in diameter through a range equal to at least about 50 percent of the average diameter of the microspheres.

2. Retroreflective sheeting comprising first and second transparent polymeric layers; a monolayer of transparent microspheres embedded in the first layer to on the average less than half their diameter but more than one-tenth their diameter, with extreme edges of the portions of the microspheres protruding from the first layer being aligned in a substantially common plane; and with the second transparent polymeric layer being laminated in substantially full contact to the microsphere-covered surface of the first layer, whereby it is in contact with, and follows the curved surfaces of, the microspheres protruding from the first layer, and also is in direct contact with the portions of the first layer between the microspheres; and a specularly reflective layer coated on the exposed configured surface of the second layer.

3. Retroreflective sheeting of claim 1 in which the microspheres cover less than 75 percent of the area of the first polymeric layer.

4. Retroreflective sheeting of claim 1 in which the microspheres vary in diameter through a range equal to at least about 50 percent of the average diameter of the microspheres.

5. Retroreflective sheeting of claim 1 in which at least one of the first and second polymeric layers comprises a thermoplastic polymer that exhibits a less-than-order-of-magnitude reduction in loss modulus measured in dynes per square centimeter over a 50°-temperature interval within the softening range of the polymer.

6. Retroreflective sheeting of claim 1 in which the first layer comprises a polymer selected from ionomers, polyurethanes, ethylene copolymers, and polyesters based on mixtures of isophthalic and terephthalic acids.

7. Retroreflective sheeting of claim 1 in which the second layer comprises a polymer selected from ionomers, polyurethanes, ethylene copolymers, and polyesters based on mixtures of isophthalic and terephthalic acids.

8. Retroreflective sheeting of claim 1 which further includes a polymeric layer covering said specularly reflective layer.

9. Retroreflective sheeting of claim 8 in which said polymeric layer comprises an adhesive.

10. Retroreflective sheeting comprising first and second transparent polymeric layers, at least one of said layers being an extruded layer which, in at least one stage during manufacture of the sheeting, is at least partially amorphous and capable of thermosoftening; a monolayer of transparent microspheres embedded in the first layer to on the average between about 20 and 40 percent of their diameter, with the extreme edges of the portions of the microspheres protruding from the first layer being located substantially in a common plane; and with the second polymeric layer being laminated in substantially full contact to the microsphere-covered surface of the first layer whereby it is in direct contact with, and follows the curved surfaces of, the portions of the microspheres protruding from the first layer, and also is in direct contact with the portions of the first layer between the microspheres; a specularly reflective layer vapor-coated on the exposed configured surface of the second layer; and a polymeric layer covering said vapor-coated layer; said retroreflective sheeting exhibiting a half-brightness angle of at least 50° on at least one axis of the sheeting.

11. Retroreflective sheeting of claim 10 in which the microspheres cover less than 75 percent of the area of the first polymeric layer.

12. Retroreflective sheeting of claim 10 in which the polymeric layer covering the vapor-coated layer comprises an adhesive.

13. Retroreflective sheeting of claim 10 in which either the first or second extruded polymeric layer comprises a polymer selected from ionically crosslinked polymer based on ethylene and acrylic or methacrylic acid.

14. Retroreflective sheeting of claim 10 in which either the first or second extruded polymeric layer comprises a polymer selected from acrylics, aliphatic urethanes, and polyesters based on isophthalic or terephthalic acid.

15. Retroreflective sheeting of claim 10 in which the microspheres vary in diameter through a range equal to at least about 50 percent of the average diameter of the microspheres.

16. Retroreflective sheeting of claim 15 in which at least one of the first and second polymeric layers comprises a thermoplastic polymer that exhibits a less-than-order-of-magnitude reduction in loss modulus measured in dynes per square centimeter over a 50° C.-temperature interval within the softening range of the polymer.

17. Retroreflective sheeting comprising first and second transparent polymeric layers; a monolayer of transparent microspheres embedded in the first layer to on the average less than half their diameter but more than one-tenth their diameter, with the extreme edges of the portions of the microspheres protruding from the first layer being aligned in a substantially common plane, said microspheres covering less than about 75 percent of the area of the first polymeric layer, with the second transparent polymeric layer being laminated in substantially full contact to the microsphere-covered surface of the first layer, whereby it is in contact with, and follows the curved surfaces of, the microspheres protruding from the first layer, and also is in contact with the portions of the first layer between the microspheres; and a specularly reflective layer coated on the exposed configured surface of the second layer.

18. A method for making retroreflective sheeting comprising forming first and second transparent polymeric layers; embedding a monolayer of microspheres in the first layer under heat and pressure to a depth of on the average less than one-half their diameter but more than one-tenth their diameter, with the extreme edges of the portions of the microspheres protruding from the first layer being aligned in a substantially common plane; laminating the second layer in substantially full contact with the microsphere-covered surface of the first layer so that the first layer is in direct contact with, and follows the curved surfaces of, the portions of the microspheres protruding from the first layer, and also is in direct contact with the portions of the first layer between the microspheres; and coating the exposed configured surface of the second layer with a specularly reflective layer.

19. A method of claim 18 in which at least one of the first and second polymeric layers comprises a thermoplastic polymer that exhibits a less-than-order-of-magnitude reduction in loss modulus measured in dynes per square centimeter over a 50° C.-temperature interval within the softening range of the polymer.

20. A method of claim 18 in which microspheres are embedded into the first polymeric layer in an amount that covers less than 75 percent of the area of the first polymeric layer.

21. A method of claim 18 in which the microspheres embedded into the first polymeric layer vary in diameter through a range equal to at least 50 percent of the average diameter of the microspheres.

22. A method of claim 18 in which the laminating force is applied under heat and pressure using a cushioning web that comprises a polymeric material which engages the second polymeric layer and which is softened during the lamination operation.

23. A method of claim 22 in which said polymeric material of the cushioning web has a loss modulus at the temperature of lamination lower than the loss modulus of the second polymeric layer.

24. A method of claim 18 in which the retroreflection of the assembly produced by lamination of the microsphere-covered first layer and second layer is measured in line with the lamination step; and the value of retroreflection measured is used to control either or both the thickness of the second layer as it is prepared and the conditions of the lamination step.

25. A method of claim 24 in which the second layer is extruded and fed directly from the extrusion equipment to the point at which it is laminated to the microsphere-covered first layer.

26. A method for making retroreflective sheeting comprising extruding first and second transparent thermoplastic at least partially amorphous polymeric layers; embedding a monolayer of microspheres in the first layer under heat and pressure to a depth of on the average between about 20 and 40 percent of their diameter, with the edges of the microspheres protruding from the first layer lying substantially in a common plane; laminating the second layer in substantially full contact with the microsphere-covered surface of the first layer so that the first layer is in direct contact with, and follows the curved surfaces of the portions of the microspheres protruding from the first layer, and also is in direct contact with the portions of the first layer between the microspheres; and vapor-coating the exposed configured surface of the second layer with a specularly reflective layer.

27. A method of claim 26 in which at least one of the first and second polymeric layers comprises a thermoplastic polymer that exhibits a less-than-order-of-magnitude reduction in loss modulus measured in dynes per square centimeter over a 50 degree-temperature interval within the softening range of the polymer.

28. A method of claim 26 in which the laminating force is applied under heat and pressure using a cushioning web that comprises a polymeric material which engages the second polymeric layer and which is softened during the lamination operation.

29. A method of claim 28 in which said polymeric material of the cushioning web has a loss modulus at the temperature of lamination lower than the loss modulus of the second polymeric layer.

* * * * *

UNITED STATES PATENT AND TRADEMARK OFFICE
CERTIFICATE OF CORRECTION

PATENT NO. : 4,505,967
DATED : March 19, 1985
INVENTOR(S) : Terry R. Bailey

It is certified that error appears in the above-identified patent and that said Letters Patent is hereby corrected as shown below:

In column 9, line 31, "croxxlinked" should be -- crosslinked --.

In claims 3-8, line 1, "claim 1" should be -- claim 2 --.

Signed and Sealed this

First Day of October 1985

[SEAL]

Attest:

DONALD J. QUIGG

Attesting Officer

Commissioner of Patents and Trademarks—Designate